(12) United States Patent
Shanmuganathan et al.

(10) Patent No.: US 9,686,207 B2
(45) Date of Patent: Jun. 20, 2017

(54) APPLICATION SERVICE LEVEL OBJECTIVE AWARE DEMAND ESTIMATION

(71) Applicant: VMware, Inc., Palo Alto, CA (US)

(72) Inventors: Ganesha Shanmuganathan, Mountain View, CA (US); Anne Holler, Los Altos, CA (US); Ajay Gulati, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 10 days.

(21) Appl. No.: 14/167,434

(22) Filed: Jan. 29, 2014

(65) Prior Publication Data

US 2015/0215234 A1 Jul. 30, 2015

(51) Int. Cl.
*H04L 12/923* (2013.01)
*H04L 12/24* (2006.01)
(Continued)

(52) U.S. Cl.
CPC ........ *H04L 47/762* (2013.01); *G06F 11/3433* (2013.01); *G06F 11/3442* (2013.01); *H04L 41/50* (2013.01); *H04L 41/5019* (2013.01); *H04L 41/5025* (2013.01); *H04L 47/808* (2013.01); *H04L 41/5003* (2013.01)

(58) Field of Classification Search
CPC ........ G06F 9/50; G06F 9/5011; G06F 9/5027; G06F 9/5061; G06F 9/5072; G06F 9/5077; G06F 2209/5019; G06F 2209/503; G06F 9/505; G06F 9/5083; G06F 9/45533; G06F 9/45558; G06F 9/5005; G06F 9/5016; G06F 9/5066; G06F 9/5088; G06F 2009/4557; G06F 2009/45583; G06F 2009/45591; G06F 2209/501; G06F 11/3006; G06F 11/301; G06F 11/3024; G06F 11/3037; G06F 11/3065; G06F 11/3072; G06F 11/3082; G06F 11/34; G06F 11/3409; G06F 11/3433; G06F 11/3442; G06F 11/3447; G06F 11/3452; G06F 11/3466; G06F 11/3476; H04L 67/10; H04L 41/50; H04L 41/5003; H04L 41/5009; H04L 41/5012; (Continued)

(56) References Cited

U.S. PATENT DOCUMENTS 6,751,718 B1 * 6/2004 Manin ................. G06F 12/08
                                                        711/170
8,046,767 B2 * 10/2011 Rolia et al. .................. 709/223
(Continued)

OTHER PUBLICATIONS

Gong et al., "PRESS: PRedictive Elastic ReSource Scaling for cloud systems," 2010 International Conference on Network and Service Management, Oct. 25-29, 2010, pp. 9-16.*
(Continued)

*Primary Examiner* — Vivek Srivastava
*Assistant Examiner* — William C McBeth

(57) ABSTRACT

A management server and method for performing resource management operations in a distributed computer system uses at least one sampling parameter to estimate demand of a client for a resource. The sampling parameter has a correlation with at least one target performance goal of an application that the client is running. The demand estimation can then be used to make at least one decision in a resource management operation.

24 Claims, 4 Drawing Sheets

(51) Int. Cl.
*G06F 11/34* (2006.01)
*H04L 12/927* (2013.01)

(58) Field of Classification Search
CPC ............. H04L 41/5016; H04L 41/5019; H04L 41/5025; H04L 47/762; H04L 47/808
USPC .................. 709/223, 224, 226; 718/100, 104
See application file for complete search history.

(56) References Cited

U.S. PATENT DOCUMENTS

| | | | | |
|---|---|---|---|---|
| 8,856,797 | B1* | 10/2014 | Siddiqui et al. | 718/104 |
| 2004/0122950 | A1* | 6/2004 | Morgan et al. | 709/226 |
| 2006/0188011 | A1* | 8/2006 | Goldszmidt | G06Q 10/04 375/229 |
| 2006/0280161 | A1* | 12/2006 | Liu et al. | 370/351 |
| 2007/0240162 | A1* | 10/2007 | Coleman | G06F 11/008 718/104 |
| 2008/0295096 | A1* | 11/2008 | Beaty et al. | 718/1 |
| 2009/0293022 | A1* | 11/2009 | Fries | 716/2 |
| 2010/0199285 | A1* | 8/2010 | Medovich | 718/104 |
| 2010/0306597 | A1* | 12/2010 | Goldszmidt | H04L 41/0681 714/47.1 |
| 2011/0072138 | A1* | 3/2011 | Canturk et al. | 709/226 |
| 2011/0145657 | A1* | 6/2011 | Bishop | G06F 11/3495 714/47.1 |
| 2011/0302578 | A1* | 12/2011 | Isci et al. | 718/1 |
| 2012/0246638 | A1* | 9/2012 | He et al. | 718/1 |
| 2012/0265881 | A1* | 10/2012 | Chen | H04L 12/12 709/226 |
| 2013/0132561 | A1* | 5/2013 | Pasala | G06F 9/5083 709/224 |
| 2014/0122706 | A1* | 5/2014 | Boerner | G06F 9/5083 709/224 |
| 2015/0347183 | A1* | 12/2015 | Borthakur | G06F 9/5088 718/105 |

OTHER PUBLICATIONS

Soundararajan et al., "StatsFeeder: An Extensible Statistics Collection Framework for Virtualized Environments," VMware Technical Journal, vol. 1, No. 1, Apr. 2012, pp. 32-44.*
Gulati et al., "VMWare Distributed Resource Management: Design, Implementation, and Lessons Learned," VMware Technical Journal, vol. 1, No. 1, Apr. 2012, pp. 45-64.*
Sabharwal et al., Cloud Capacity Management—Chapter 11 Capacity Monitoring, 2013, pp. 99-108.*
Xiao et al., "Dynamic Resource Allocation Using Virtual Machines for Cloud Computing Environment", IEEE Transactions on Parallel and Distributed Systems, vol. 24, No. 6, Jun. 2013, pp. 1107-1117.*
Agrawal, B. et al.; "VMware View 5 Performance and Best Practices"; http://www.vmware.com/files/pdf/view/VMware-View-Performance-Study-Best-Practices-Technical-White-Paper.pdf; 2011.
Shanmuganathan, G. et al.; "Defragmenting the Cloud Using Demand-based Resource Allocation"; Sigmetrics 2013; Jun. 2013.
Serengeti: Deploy, manage and use Hadoop clusters easily; http://www.vmware.com/hadoop/serengeti.html; 2012; accessed Jul. 3, 2014.
Waldspurger, C. A.; "Memory Resource Management in VMware ESX Server"; In USENIX OSDI 2002.
Xiong, P. et al.; "vPerfGuard: an Automated Model-Driven Framework for Application Performance Diagnosis in Consolidated Cloud Environments"; Apr. 21, 2013.
Zhu, X. et al.; "Apprm:Application resource management"; 2013.

* cited by examiner

APPLICATION SERVICE LEVEL OBJECTIVE AWARE DEMAND ESTIMATION

BACKGROUND

Demand estimations of resource-consuming clients, such as virtual machines (VMs), are critical for resource management in a distributed computer system. For example, VM demand estimations are used to make load-balancing decisions and to compute resource entitlements for VMs running in a distributed computer system. VM demand estimations are also used to allocate resources, such as CPU and memory resources, to VMs running as part of a virtual datacenter.

For applications that are supported by VMs, the demand estimations of these VMs may affect their performance and the overall resources required for the VMs. If the VM demand estimations are too low, then the applications may experience increased latencies during operation due to lack of sufficient resources allocated to the VMs that were based on the low VM demand estimations. If the VM demand estimations are too high, then the VMs may be allocated with much more resources than needed based on the high VM demand estimations, which increases the cost associated with running the VMs. Thus, there is a need to properly estimate VM demands that are running applications to efficiently balance application performances and VM resource requirements.

SUMMARY

A management server and method for performing resource management operations in a distributed computer system uses at least one sampling parameter to estimate demand of a client for a resource. The sampling parameter has a correlation with at least one target performance goal of an application that the client is running. The demand estimation can then be used to make at least one decision in a resource management operation.

A method for performing resource management operations in a distributed computer system in accordance with an embodiment of the invention comprises initiating a resource management operation in the distributed computer system, the resource management operation involving at least one client in the distributed computer system that is running an application, reading at least one sampling parameter associated with the client, the at least one sampling parameter having a correlation with at least one target performance goal of the application, estimating a demand of the client for a resource using the sampling parameter to derive a demand estimation, and using the demand estimation of the client to make at least one decision in the resource management operation. In some embodiments, the steps of this method are performed when program instructions contained in a computer-readable storage medium are executed by one or more processors.

A management server in accordance with an embodiment of the invention comprises a resource management module configured to perform resource management operations in a distributed computer system. The resource management module is further configured to initiate a resource management operation in the distributed computer system, the resource management operation involving at least one client in the distributed computer system that is running an application, read at least one sampling parameter associated with the client, the at least one sampling parameter having a correlation with at least one target performance goal of the application, estimate a demand of the client for a resource using the sampling parameter to derive a demand estimation, and use the demand estimation of the client to make at least one decision in the resource management operation.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
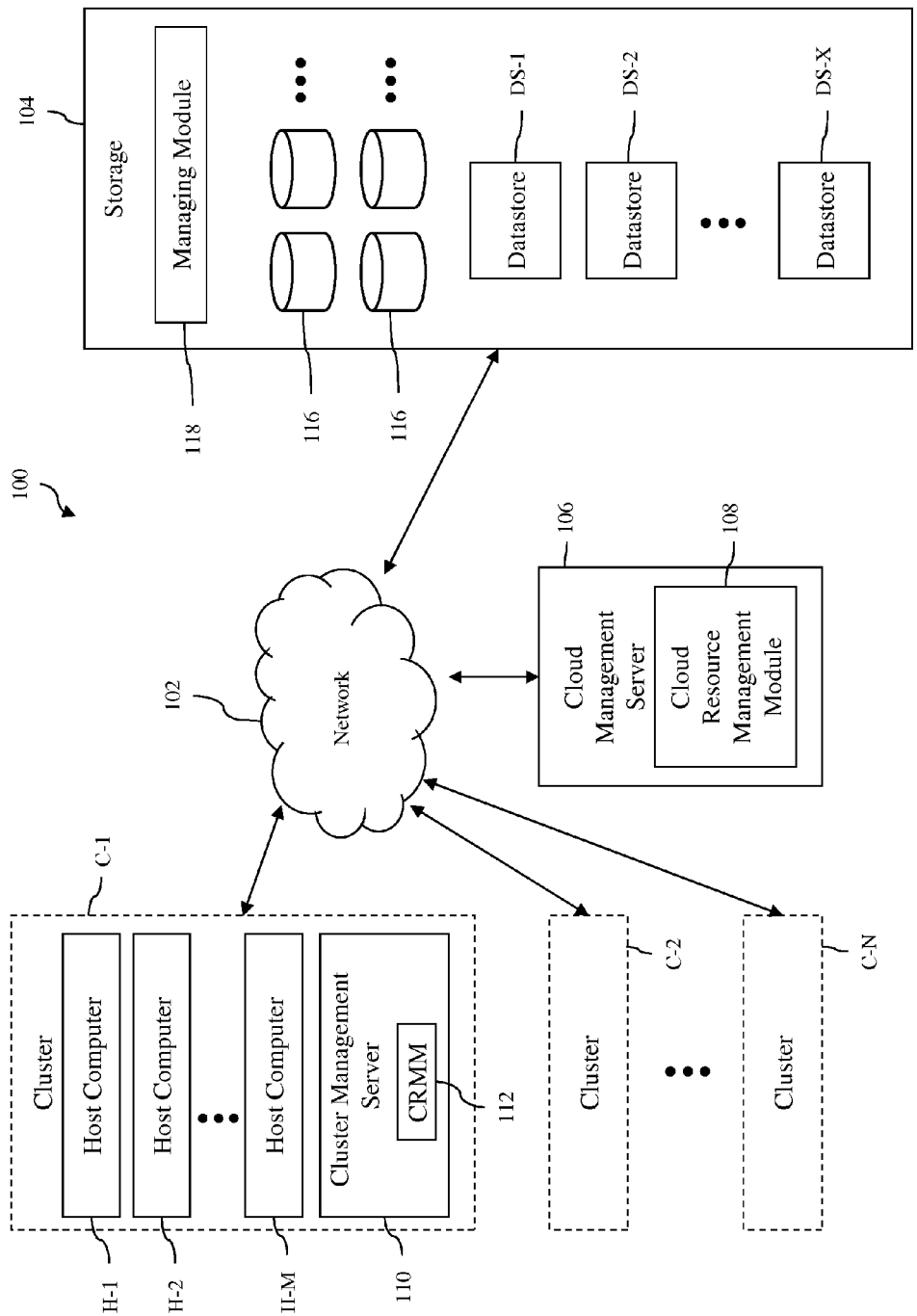
FIG. 1 is a block diagram of a distributed computer system in accordance with an embodiment of the invention.

Turning now to FIG. 1, a distributed computer system 100 in accordance with an embodiment of the invention is shown. As described in more detail below, the distributed computer system 100 supports a number of clients, which may be running various applications for various virtual datacenters. As used herein, the term "client" is any software entity that can run on a computer system, such as a software application, a software process or a virtual machine (VM). However, in this disclosure, various embodiments of the invention will sometimes be described with reference to VMs, which are used as representative of various clients. Thus, it is to be understood that the embodiments of the invention described herein may also apply to other types of clients.

For a single application, one or more clients, e.g., VMs, may be running to execute the application. The management of resources for these VMs is important to meet performance goals, such as Service Level Objectives (SLOs). Resource management techniques usually rely on demands of the VMs for resources, which need to be estimated using historical data related to usage of the resources, such as CPU, memory, network and storage resources. Since different applications have different performance goals, for some applications, not allocating the real demand may be tolerable, while for other applications, such allocation may be unacceptable. In particular, if the resource demands of VMs running an application are not properly estimated, the application may fail to meet its performance goals because of not allocating enough resources. However, resource demands of VMs are currently estimated without consideration of the performance goals of the application. As described in detail below, the distributed computer system 100 uses resource demands of VMs that are estimated in consideration of the performance goals of the applications for various resource management solutions. Thus, the distributed computer system is better able to satisfy the performance goals of the applications running in the system.

As shown in FIG. 1, the distributed computer system 100 includes a network 102, clusters C-1, C-2 . . . C-N (where N is a positive integer) of host computers, storage 104 and a cloud management server 106 with a cloud resource management module 108. The clusters, the storage and the cloud management server are connected to the network. Thus, each of the host computers in the clusters is able to access the storage via the network and may share the resources provided by the storage with the other host computers. Consequently, any process running on any of the host computers may also access the storage via the network.

In the illustrated embodiment, each of the clusters C-1, C-2 . . . C-N includes a number of host computers H-1, H-2 . . . H-M (where M is a positive integer) and a cluster management server 110. The number of host computers included in each of the clusters can be any number from one to several hundred or more. In addition, the number of host computers included in each of the clusters can vary so that different clusters can have different number of host computers. The host computers are physical computer systems that host or support one or more clients, e.g., VMs, so that the clients are running on the physical computer systems. As an example, the host computers may be servers installed in one or more server racks. Typically, the host computers of a cluster are located within the same server rack.

Figure 2:
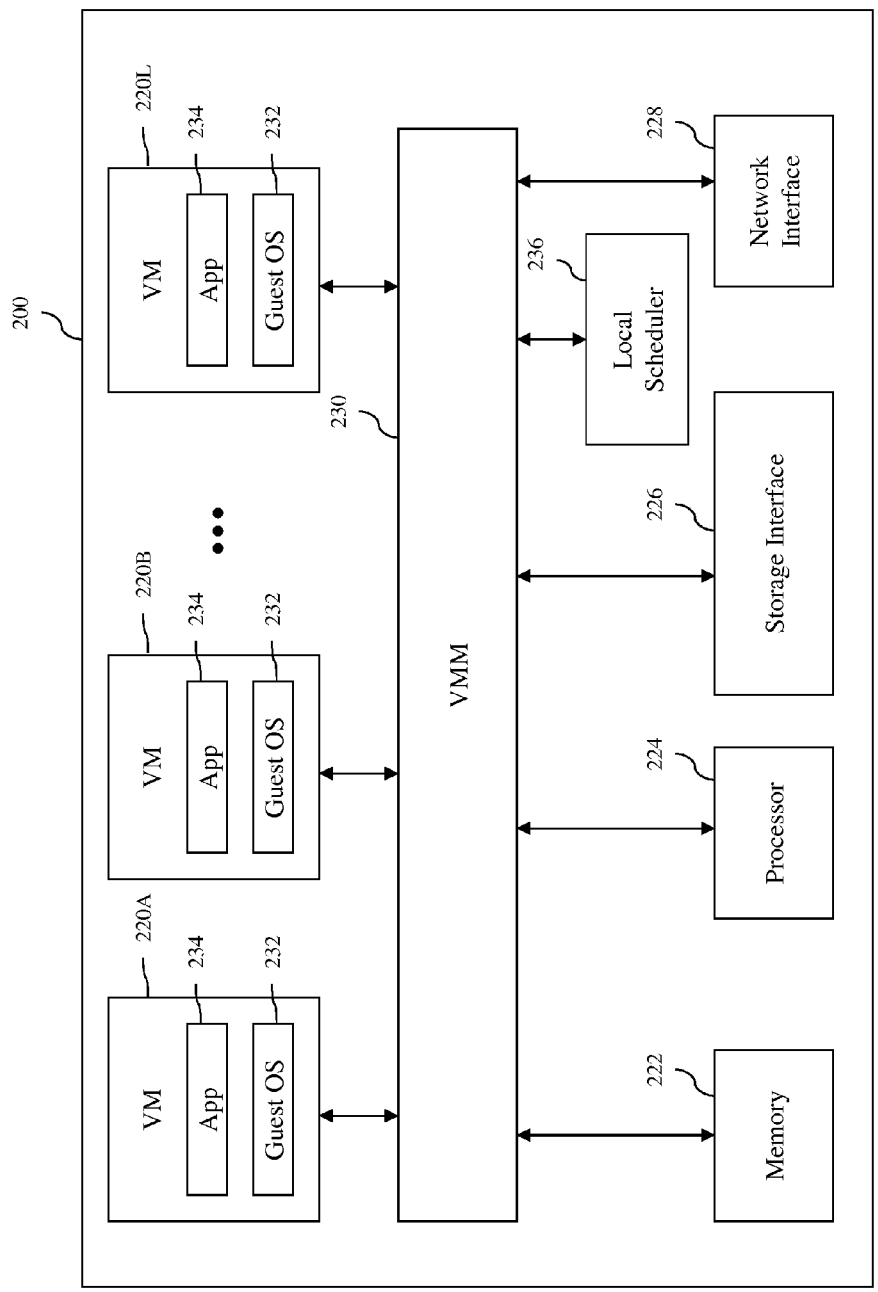
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one thousand. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software programs running on the host computer. However, in other embodiments, the local scheduler may be implemented using any combination of software and hardware.

Turning back to FIG. 1, each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the clients running on the host computers, for example, virtual machines (VMs), in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the respective cluster management server. Typically, the client demand determinations are made frequently, e.g., every few milliseconds.

The cluster management servers 110 may also perform various operations to manage the clients and the host computers H-1, H-2 . . . H-M in their respective clusters. As illustrated in FIG. 1, in an embodiment, each cluster management server include a cluster resource management module (CRMM) 112, which can be enabled by a user, to perform resource allocations, which may include storage resource allocations, and load balancing in the respective cluster. The cluster resource management module may be configured to select an appropriate host computer in the cluster when a new client is to be added to the cluster. The cluster resource management module may be configured to power down particular clients and/or host computers in the cluster to conserve power. The cluster resource management module in the cluster management server may be configured or programmed to perform other operations to manage the cluster. The cluster resource management module in each of the clusters performs at least some of these resource management operations using demand estimations for the clients in the cluster, which are tailored to applications that the clients are running, as described in more detail below. Thus, the cluster resource management module is better able to manage resources for the clients in the cluster to ensure that applications being executed by the clients satisfy their target performance goals, e.g., Service Level Objectives (SLOs).

In some embodiments, the cluster management servers 110 may be physical computers. In other embodiments, the cluster management servers may be implemented as software programs running on physical computers, such as the host computer 200 shown in FIG. 2, or virtual computers, such as the 220A, 220B . . . 220L. In an implementation, the cluster management servers are VMware vCenter™ servers with at least some of the features available for such servers, the resource management modules 112 in the cluster management servers are VMware Distributed Resource Schedulers.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 118, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters C-1, C-2 . . . C-N. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cloud management server 106 operates to monitor and manage the clusters C-1, C-2 . . . C-N to provide a cloud environment using the host computers H-1, H-2 . . . H-M in the clusters. The cloud management server allows users or customers to create and use virtual datacenters (VDCs) with specified resource requirements. A VDC can be viewed as a resource pool, where one or more resources in the resource pool is allocated or divvied among clients, e.g., VMs, in the VDC. One VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. In addition, one VDC may support one or more applications, which are running on the clients in the VDC.

The cloud resource management module 108 of the cloud management server 106 performs operations to manage the VDCs supported by the distributed computer system 100, including resource management operations for the supported VDCs. Similar to the cluster resource management modules 112 in the clusters C-1, C-2 . . . C-N, the cloud resource management module performs at least some of these resource management operations using demand estimations for the clients in the VDCs, which are tailored to applications that the clients are running, as described in more detail below. Thus, the cloud resource management module is better able to manage resources for the clients in the VDCs to ensure that applications running in the VDCs satisfy their target performance goals, e.g., Service Level Objectives (SLOs).

In some embodiments, the cloud management server 106 with the cloud resource management module 108 may be a physical computer. In other embodiments, the cloud management server may be implemented as software program running on a physical computer or a VM, which may be part of one of the clusters C-1, C-2 . . . C-N. In an implementation, the cloud management server is VMware vCloudDirector™ server with at least some of the features available for such a server.

As noted above, the cluster resource management module 112 in each of the clusters C-1, C-2 . . . C-N and the cloud resource management module 108 perform at least some resource management operations using resource demand estimations for the clients. However, unlike conventional resource demand estimation techniques, which typically involve using the same sampling parameters for all clients running in the cluster to compute the demand estimations for the clients, the cluster resource management module and the cloud resource management module use customized sampling parameters for each client depending on one or more target performance goals for the application that the client is running, e.g., SLOs of the application. Thus, the resource demand estimations are computed taking into consideration the performance goals of the applications that the clients are running.

These sampling parameters include one or more parameters that affect the sampling of demand-related statistics for a client in order to estimate the demand of the client. In an embodiment, the sampling parameters used by the cluster resource management modules 112 and the cloud resource management module 108 include a sampling interval parameter, a duration parameter and an aggregation function parameter, which are described below.

The sampling interval parameter defines the time interval at which each sample, i.e., the demand-related statistics, is measured. The sampling interval parameter can be any interval of time, such as 10 seconds, 20 seconds or a 1 minute. Thus, each sample includes one or more statistical values for the sampling time interval defined by the sampling interval parameter.

The duration parameter defines the collection time period during which samples for a particular client that should be considered for computing the demand estimation for that client. This collection period can be defined as the number of samples that should be collected. Thus, the duration parameter can be any number to denote the number of samples to consider. For example, the duration parameter may be a ten, a hundred or even a thousand so that ten, hundred or thousand samples are considered in the demand estimation calculation. The collection period may alternatively be expressed in terms of a time period, such as few minutes, few hours or few days, so that samples measured during the specified time period are considered in the demand estimation calculation.

The aggregation function parameter defines the aggregation function that is used to compute representative demand for the collection period. Options for the aggregation function parameter may include a maximum setting, which determines the maximum demand during the collection period, and an average setting, which determines the average demand during the collection period. The options for the aggregation function parameter may also include a percentage setting, such as ninety percent (90%), eighty percent (80%) or any other percentage, which determines the demand estimation at the set percentage. For example, if CPU usage values for samples collected during the collection period ranges from zero MHz to 1200 MHz with average of 525 MHz, the CPU demand estimation will differ depending on the aggregation function parameter. If the aggregation function parameter is set to the maximum setting, then the CPU demand estimation will be 1200 MHz. If the aggregation function parameter is set to the average setting, then the CPU demand estimation will be 525 MHz. If the aggregation function parameter is set to the eighty percent setting, then the CPU demand estimation will be 960 MHz.

Each of these sampling parameters affects the computation of client demand estimation. Using these sampling parameters, application aware client demand estimation can be made to make better resource management decisions and to meet application level goals, such as SLOs. Consider a simple example where some VMs have a workload that spikes at short intervals of few seconds to 80% CPU used but the average demand over a minute is only 50%. In this case, resource management solutions will make decisions based on the demand close to 50% CPU utilization, which can lead to unmet CPU demand at short intervals. Also if a capacity C is needed for all the VMs to meet their performance goals, a customer may have to provision more than the capacity C in a cluster of host computers. One reason for this is that resource management entities currently do not properly allocate resources to the VMs that need the resources the most. A typical resource management entity uses a fixed time average, e.g., five (5) minute average, for all its calculations. This might be sufficient for some VMs to meet their target application performance levels, but other VMs may have target application performance levels that cannot be met even when their demand based on fixed time average is met. To avoid these types of situations, customers may under-commit the resources of clusters sufficiently enough so that the VM's target application performance levels are met. One solution to this problem without under-committing the resource of clusters has been to set per-VM resource controls, such as reservation on VMs that have higher target application performance levels. However, setting these resource controls is difficult as the right values for a VM depend not only on the workload, which may change over time, but also on the loads of other VMs in the same cluster. This can also reduce the consolidation ratios because the maximum consolidation is inversely proportional to sum of reservations. Rather than adjusting resource controls of individual VMs to meet target application levels, in accordance with embodiments of the invention, the demand estimation of a VM is adjusted according to target application levels for the application running on the VM using sampling parameters that have been predetermined for the application with the target application levels without significantly reducing the consolidation ratios.

In an embodiment, the sampling parameters for the clients running different applications are provided to the cluster resource management modules 112 and/or the cloud resource management module 108 so that the sampling parameters can be used by the cluster resource management modules and the cloud resource management module to perform various resource management operations. These sampling parameters are determined based on the target performance goals of the applications. Thus, a client running the same application as another client may be assigned different sampling parameters depending on the target performance goals. In contrast, a client running a different application as another client may be assigned the same sampling parameters depending on the target performance goals. However, a client running an application with different target performance, regardless of whether the application is the same or different application as another client, typically will have different sampling parameters than that other client.

Figure 3:
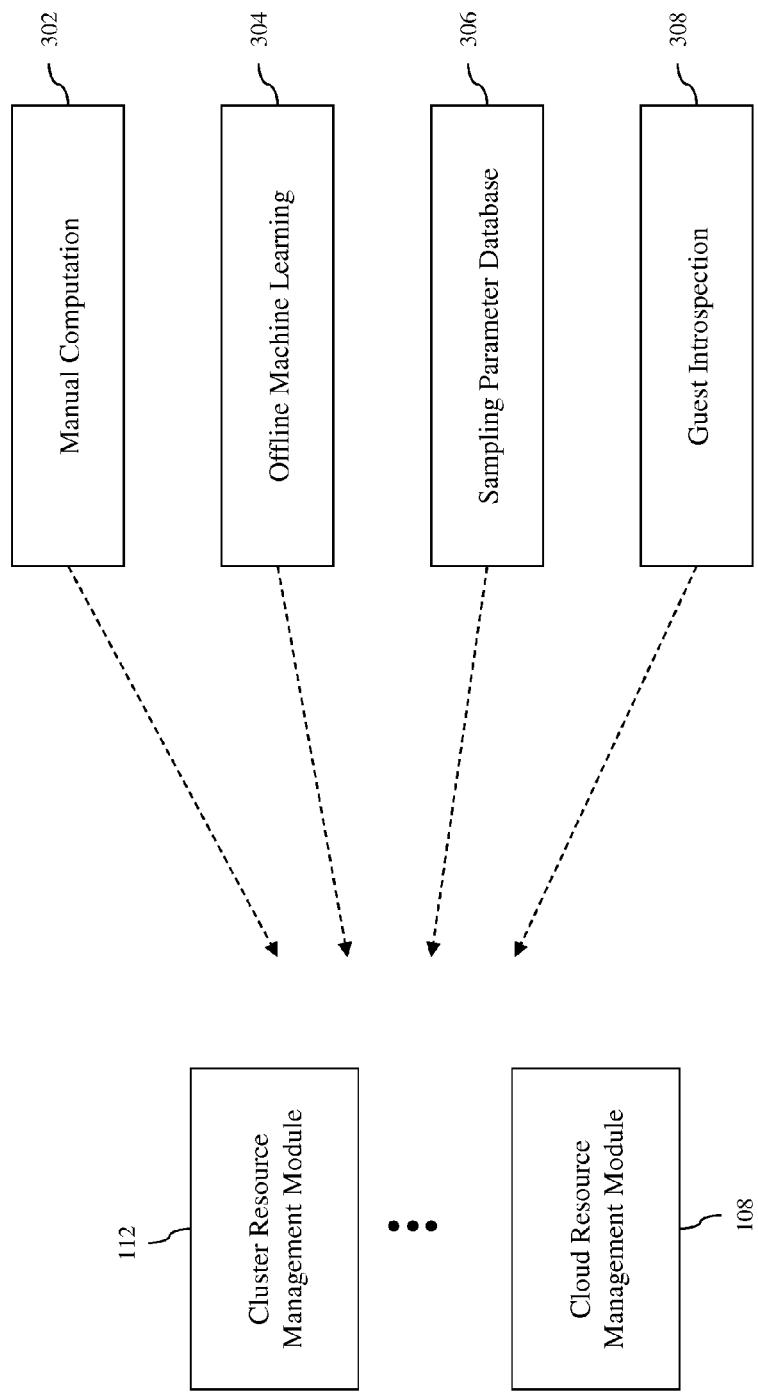
FIG. 3 is an illustration of different methods of obtaining sampling parameters in accordance with an embodiment of the invention.

Turning now to FIG. 3, different methods of obtaining sampling parameters to be provided to the cluster resource management modules 112 and/or the cloud resource management module 108 for clients in the distributed computer system 100 in accordance with an embodiment of the invention are illustrated. In one implementation, the sampling parameters are provided to only the cluster resource management modules, which then provide the sampling parameters to other components in the distributed computer system, such as the cloud resource management module. As shown in FIG. 3, the different methods of obtaining the sampling parameters for a client running an application includes a manual computation 302, an offline machine learning 304, a sampling parameter database 306 and a guest introspection 308, each of which is described below.

The manual computation 302 involves calculating the sampling parameters for a client running an application manually. In this method, an administrator can set the sampling parameters manually, either from a priori knowledge or by running the application in a sandbox and making observations related to the sampling parameters and the resulting performance levels. As an example, an administrator may try different sampling parameters to compute demand estimations and correlate the sampling parameters with the resulting application performance levels. These observations can then be used to enter the appropriate sampling parameters for the client into the cluster resource management modules 112 and/or the cloud resource management module 108 to ensure that target application performance levels, e.g., SLOs, are met.

The offline machine learning 304 involves using an offline machine learning based technique to determine the appropriate sampling parameters for a client that is running an application with certain target application performance levels, e.g., SLOs. This may be accomplished by running one of more of the cluster resource management modules 112 and the cloud resource management module 108 offline, exploring different sampling parameters to compute demand estimations and correlating the sampling parameters with the resulting application performance levels. This correlation between the sampling parameters and the resulting application performance levels can then used to enter the appropriate sampling parameters for the client into the cluster resource management module and/or the cloud resource management module to ensure that target application performance levels are met. This offline approach is similar to the sandbox approach for the manual computation 302. However, this offline approach may be less tedious, although it involves operational overhead in running the offline analysis.

The sampling parameter database 306 involves using a database with target performance levels, e.g., SLOs, for applications and corresponding sampling parameters. This information could be complied manually by experts or by sharing the information gathered in offline machine learning. If the information is provided by other users, the database may be populated by a phone-home mechanism to report these values to a central location. The database may be stored in any computer storage, such as the storage 104, that is accessible by any entity in the distributed computer system 100.

The guest introspection 308 involves using guest tools running in their systems to gather information to heuristically determine the appropriate sampling parameters for a client that is running an application with certain target application performance levels, e.g., SLOs. As an example, a guest tool could look at VM statistics, such as swapping and ballooning, as well as application metrics, such as throughput and latency, to come up with the appropriate sampling parameters.

Once these sampling parameters have been determined, clients, e.g., VMs, can be tagged or associated with the appropriate sampling parameters, depending on the target performance goals of the applications that the clients are or will be running. These sampling parameters for the clients can then be used by the cluster resource management module 112 in each of the cluster management servers 110 and/or the cloud resource management module 108 to estimate demands of the clients to ensure that the target performance goals of the applications, e.g., application SLOs, are met.

When one of the cluster resource management modules 112 or the cloud resource management module 108 initiates a resource management operation that requires computing demand estimation of one or more clients running one or more applications, the resource management module or the cloud resource management module reads the tagged sampling parameters for the clients. The resource management operation may involve load balancing, resource allocation, cost-benefit analysis and/or powering on/off clients. As described above, the sampling parameters may include a sampling interval parameter, a duration parameter, the aggregation function parameter and/or other demand-related statistics. The sampling parameters are used to acquire data regarding historical demand of a client so that the demand of the client can be estimated. As an example, demand estimation for CPU may be computed by applying the VM workload specific aggregation function on samples collected based on the VM's duration parameter. Each CPU sample could be computed using the following equation:

$$CPU_{demand} = CPU_{used} + CPY_{ready} \times \frac{CPU_{run}}{CPU_{run} + CPU_{sleep}},$$

where $CPU_{used}$ is the amount of time that CPU was used by a client, $CPU_{ready}$ is the amount of time that that the client was ready to use CPU but had to wait, $CPU_{run}$ is the amount of time that CPU was running and $CPU_{sleep}$ is the amount of time that CPU was sleeping. As another example, memory demand may be estimated by tracking a set of randomly selected pages in a client's physical address space and computing the number of pages that get touched within a certain time period. The size of the set of randomly chosen pages are again selected based on VM's SLO based sampling parameters. If 25% of sampled pages are touched for a client with 8 Gigabyte (GB) random access memory (RAM), then the memory demand is estimated to be 0.25*8=2 GB.

The computed demand estimations of resources for the client are then used by the cluster resource management module 112 or the cloud resource management module 108 to make one or more decision in the resource management operation. The decision may be which client to power on or power off, how much resources to allocate to a particular client and which client to move from one host computer to another host computer.

In some embodiments, the sampling parameters for a client at one level may be different for another level. For example, at the cluster level, the client may be associated with particular sampling parameters, which are used by a cluster resource management module. However, at the cloud level (above the cluster level), the client may be associated with different sampling parameters, which are used by the cloud resource management module 108. In addition, the sampling parameters for a client may vary depending on the entity that is performing a resource management operation. Although the cluster resource management modules 112 and the cloud resource management module 108 have been described herein as entities that use the sampling parameters to compute resource demand estimations, other entities or processes in the distributed computer system 100 may also use the sampling parameters that have been correlated with target performance goals of applications.

Figure 4:
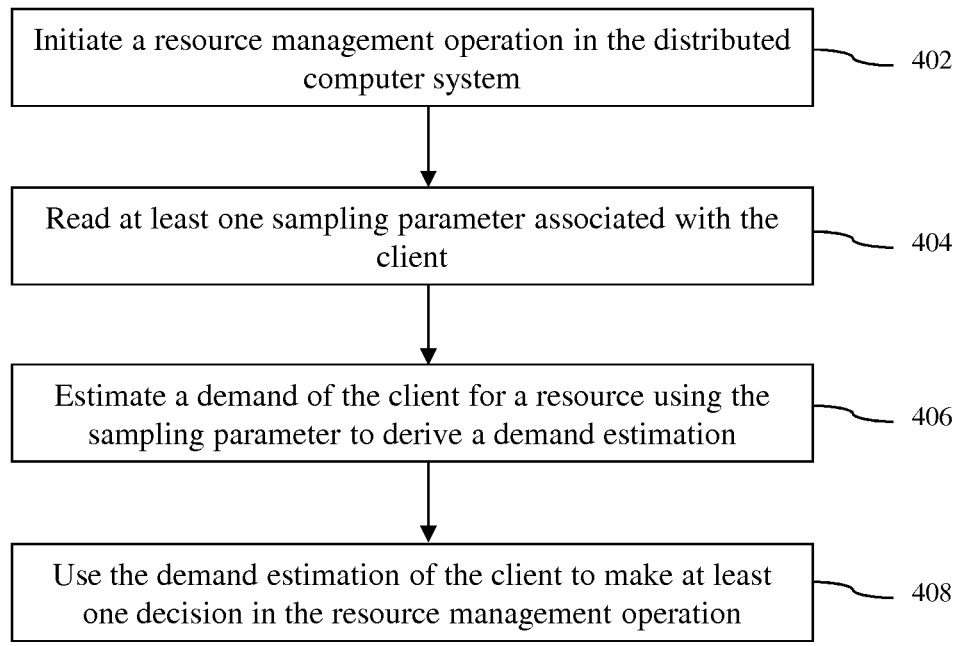
FIG. 4 is a flow diagram of a method for performing resource management operations in a distributed computer system in accordance with an embodiment of the invention.

A method for performing resource management operations in a distributed computer system in accordance with an embodiment of the invention is described with reference to a flow diagram of FIG. 4. At block 402, a resource management operation in the distributed computer system is initiated. The resource management operation involves at least one client in the distributed computer system that is running an application. At block 404, at least one sampling parameter associated with the client is read. The sampling parameter has a correlation with at least one target performance goal of the application. At block 406, a demand of the client for a resource is estimated using the sampling parameter to derive a demand estimation. At block 408, the demand estimation of the client is used to make at least one decision in the resource management operation.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing resource management operations in a distributed computer system, the method comprising:

initiating a resource management operation in the distributed computer system, the resource management operation involving a client in the distributed computer system that is running an application;

determining at least one customized sampling parameter for the client based on client swapping and ballooning statistics, wherein the at least one customized sampling parameter depends on at least one target performance goal of the application that the client is running;

deriving a demand estimation of the client for a resource according to the at least one target performance goal of the application using the at least one customized sampling parameter, wherein the at least one customized sampling parameter includes an aggregation function parameter, the aggregation function parameter defining a function to compute a representative demand of the client for the resource for a collection time period as a predetermined percentage of a maximum demand of the client for the resource received during the collection time period, wherein deriving the demand estimation of the client for the resource comprises computing the representative demand for the collection time period as the predetermined percentage of the maximum demand received during the collection time period;

using the demand estimation of the client to make at least one decision in the resource management operation; and executing a resource management operation based on the at least one decision, wherein the resource management operation comprises at least one of a powering on/off operation, a resource allocation operation and a migration operation of the client.

2. The method of claim 1, wherein the at least one customized sampling parameter includes a sampling interval parameter, the sampling interval parameter defining a time interval at which demand-related statistics for the client are measured.

3. The method of claim 1, wherein the at least one customized sampling parameter includes a duration parameter, the duration parameter defining the collection time period during which demand-related statistics for the client are collected.

4. The method of claim 1, wherein the at least one customized sampling parameter further includes a sampling interval parameter, the sampling interval parameter defining a time interval at which demand-related statistics for the client are measured, and a duration parameter, the duration parameter defining the collection time period during which demand-related statistics for the client are collected.

5. The method of claim 1, wherein the at least one target performance goal of the application includes at least one Service Level Objective (SLO).

6. The method of claim 1, wherein determining the at least one customized sampling parameter comprises receiving the at least one customized sampling parameter that is set manually.

7. The method of claim 1, wherein determining the at least one customized sampling parameter comprises determining the at least one customized sampling parameter using offline machine learning technique to correlate sampling parameters with different target performance goals of applications.

8. The method of claim 1, wherein determining the at least one customized sampling parameter comprises determining the at least one customized sampling parameter using a database of sampling parameters that are correlated with different target performance goals of applications.

9. The method of claim 1,
wherein deriving the demand estimation of the client for the resource comprises deriving a demand estimation of the client for a processor as:

$$P_{demand} = P_{used} + P_{ready} \times \frac{P_{run}}{P_{run} + P_{sleep}},$$

where $P_{demand}$ demand represents the processor demand estimation, $P_{used}$ represents an amount of time that the processor was used by the client, $P_{ready}$ represents an amount of time that the client was ready to use the processor but had to wait, $P_{run}$ represents an amount of time that the processor was running, and $P_{sleep}$ represents an amount of time that the processor was sleeping.

10. The method of claim 1,
wherein deriving the demand estimation of the client for the resource comprises deriving a demand estimation of the client for a memory by tracking a set of randomly selected pages in a physical address space of the client and computing the number of pages accessed within a certain time period.

11. The method of claim 1,
wherein deriving the demand estimation of the client for the resource comprises deriving a demand estimation of the client for a processor based on an amount of time that the processor was used by the client, an amount of time that the client was ready to use the processor but had to wait, an amount of time that the processor was running and an amount of time that the processor was sleeping.

12. The method of claim 1,
wherein determining the at least one customized sampling parameter for the client based on client swapping and ballooning statistics comprises determining the at least one customized sampling parameter for the client based on the client swapping and ballooning statistics and application metrics comprising throughput and latency metrics.

13. A non-transitory computer-readable storage medium containing program instructions for performing resource management operations in a distributed computer system, wherein execution of the program instructions by one or more processors of a computer system causes the one or more processors to perform steps comprising:
initiating a resource management operation in the distributed computer system, the resource management operation involving a client in the distributed computer system that is running an application;
determining at least one customized sampling parameter for the client based on client swapping and ballooning statistics, wherein the at least one customized sampling parameter depends on at least one target performance goal of the application that the client is running;
deriving a demand estimation of the client for a resource according to the at least one target performance goal of the application using the at least one customized sampling parameter, wherein the at least one customized sampling parameter includes an aggregation function parameter, the aggregation function parameter defining a function to compute a representative demand of the client for the resource for a collection time period as a predetermined percentage of a maximum demand of the client for the resource received during the collection time period,
wherein deriving the demand estimation of the client for the resource comprises computing the representative demand for the collection time period as the predetermined percentage of the maximum demand received during the collection time period;
using the demand estimation of the client to make at least one decision in the resource management operation; and
executing a resource management operation based on the at least one decision, wherein the resource management operation comprises at least one of a powering on/off operation, a resource allocation operation and a migration operation of the client.

14. The non-transitory computer-readable storage medium of claim 13, wherein the at least one customized sampling parameter includes a sampling interval parameter, the sampling interval parameter defining a time interval at which demand-related statistics for the client are measured.

15. The non-transitory computer-readable storage medium of claim 13, wherein the at least one customized sampling parameter includes a duration parameter, the duration parameter defining a collection time period during which demand-related statistics for the client are collected.

16. The non-transitory computer-readable storage medium of claim 13, wherein the at least one customized sampling parameter further includes a sampling interval parameter, the sampling interval parameter defining a time interval at which demand-related statistics for the client are measured, and a duration parameter, the duration parameter defining the collection time period during which demand-related statistics for the client are collected.

17. The non-transitory computer-readable storage medium of claim 13, wherein the at least one target performance goal of the application includes at least one Service Level Objective (SLO).

18. The non-transitory computer-readable storage medium of claim 13, wherein determining the at least one customized sampling parameter comprises determining the at least one customized sampling parameter using sampling parameters that have been manually correlated with different target performance goals of applications.

19. The non-transitory computer-readable storage medium of claim 13, wherein determining the at least one customized sampling parameter comprises determining the at least one customized sampling parameter using sampling parameters that have been correlated using an offline machine learning technique with different target performance goals of applications.

20. The non-transitory computer-readable storage medium of claim 13, wherein determining the at least one customized sampling parameter comprises determining the at least one customized sampling parameter using a database of sampling parameters that are correlated with different target performance goals of applications.

21. A management server for a distributed computer system, wherein the management server comprises a processor and memory, and wherein the management server is configured to:
    initiate a resource management operation in the distributed computer system, the resource management operation involving a client in the distributed computer system that is running an application;
    determine at least one customized sampling parameter for the client based on client swapping and ballooning statistics, wherein the at least one customized sampling parameter depends on at least one target performance goal of the application that the client is running;
    derive a demand estimation of the client for a resource according to the at least one target performance goal of the application using the at least one customized sampling parameter, wherein the at least one customized sampling parameter includes an aggregation function parameter, the aggregation function parameter defining a function to compute a representative demand of the client for the resource for a collection time period as a predetermined percentage of a maximum demand of the client for the resource received during the collection time period,
    wherein the management server is further configured to derive the demand estimation of the client for the resource by computing the representative demand for the collection time period as the predetermined percentage of the maximum demand received during the collection time period;
    use the demand estimation of the client to make at least one decision in the resource management operation; and
    execute a resource management operation based on the at least one decision, wherein the resource management operation comprises at least one of a powering on/off operation, a resource allocation operation and a migration operation of the client.

22. The management server of claim 21, wherein the at least one customized sampling parameter includes a sampling interval parameter, the sampling interval parameter defining a time interval at which demand-related statistics for the client are measured.

23. The management server of claim 21, wherein the at least one customized sampling parameter includes a duration parameter, the duration parameter defining a collection time period during which demand-related statistics for the client are collected.

24. The management server of claim 21, wherein the at least one target performance goal of the application includes at least one Service Level Objective (SLO).

* * * * *